Figure 1:
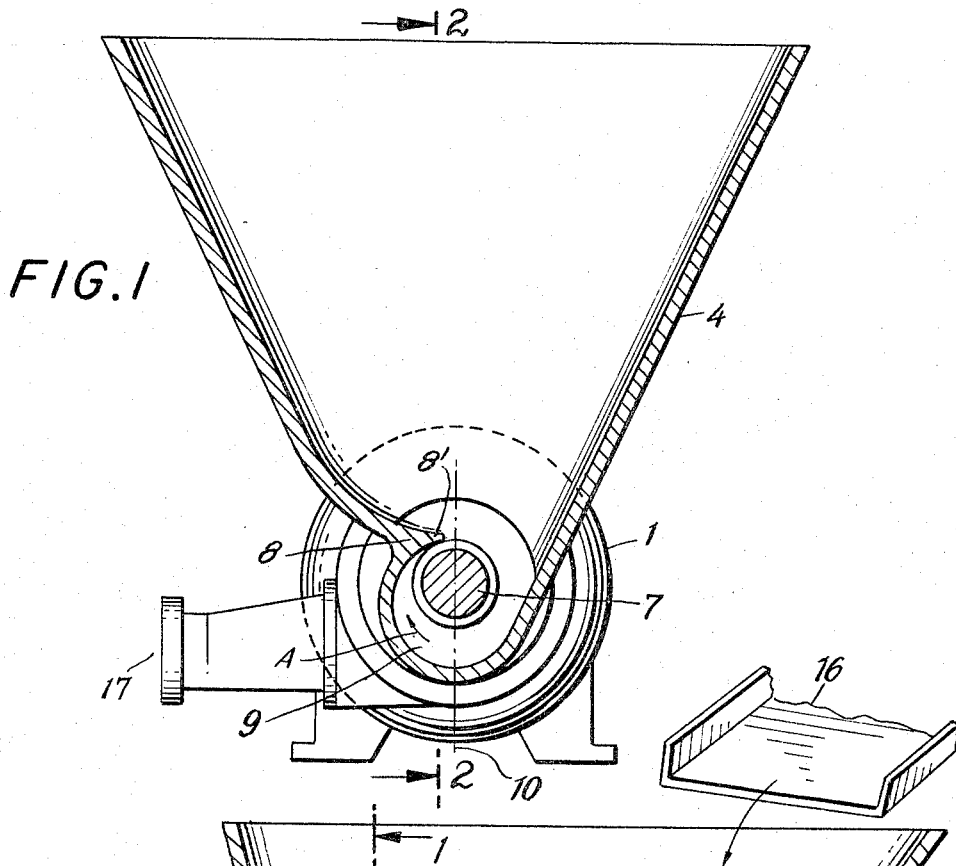

INVENTOR
Fritz Otto
BY
Michael J. Striker
ATTORNEY ic for the invention are set forth in particular in the appended claims. The invention itself, however, both

United States Patent Office 3,289,720
Patented Dec. 6, 1966

3,289,720
CHARGING ARRANGEMENT FOR A MEAT GRINDER OR THE LIKE
Fritz Otto, Hameln, Germany, assignor to A. Stephan u. Söhne, Hameln (Weser), Germany, a corporation of Germany
Filed Nov. 4, 1964, Ser. No. 408,799
7 Claims. (Cl. 146—182)

The present invention relates to a meat grinder and more specifically to a charging arrangement for a meat grinder.

Meat cutting machines which cut the meat into chunks are often combined with meat grinders in such a manner that the pre-cut meat is fed directly through a chute of the meat cutting machine into the hopper of the meat grinder. A meat grinder with substantially horizontally arranged feed screw and cutter axis provides in such an arrangement substantial advantages in that the overall height of such an arrangement becomes relatively low, so that the space requirements of such an arrangement are small.

A disadvantage of a meat grinder with horizontal axis is, however, that the feed screw rotating at high speed about the horizontal axis tends to fling the material fed into the feed hopper upwardly on the ascending side of the feed screw. This will detrimentally affect the proper feed of the material by the feed screw and also prevent complete discharge of the feed hopper at the end of the charging operation.

It is an object of the present invention to overcome these disadvantages of charging arrangements for meat grinders having a horizontally arranged feed screw.

It is a further object of the present invention to provide in a charging arrangement for a meat grinder having horizontally arranged feed screw, means which positively prevent material fed by the feed screw from being upwardly flung into the hopper on the ascending side of the feed screw, to obtain thereby an optimum feed and a complete discharge of the feed hopper at the end of the charging operation.

It is an additional object of the present invention to provide for such an arrangement which is composed of simple and rugged parts so that the arrangement will operate trouble-free during an extended period.

With these objects in view the present invention mainly comprises in a charging arrangement for a meat grinder a substantially horizontally arranged casing having an open inlet end, a feed hopper connected to the casing and having an inlet end communicating with the inlet end of the casing, a feed screw having a substantially horizontal axis extending through the inlet end of the casing into the outlet end of the hopper into the latter and being adapted to be rotated at high speed in one direction about its axis for feeding the material to be ground in axial direction from the hopper into the casing, and wall means in the hopper extending transversely over the ascending side of the feed screw for preventing material fed by the feed screw from being upwardly flung into the hopper on the ascending side of the feed screw.

The aforementioned wall means preferably form part of a lower portion of the hopper on the ascending side of the feed screw for covering the latter substantially up to the vertical plane including the axis of the feed screw. The feed screw is preferably conical, tapering toward the free end of the feed screw in the hopper and the latter has preferably a bottom wall which includes an acute angle with the axis of the feed screw which is preferably substantially equal to half of the cone angle of the feed screw.

Figure 2:
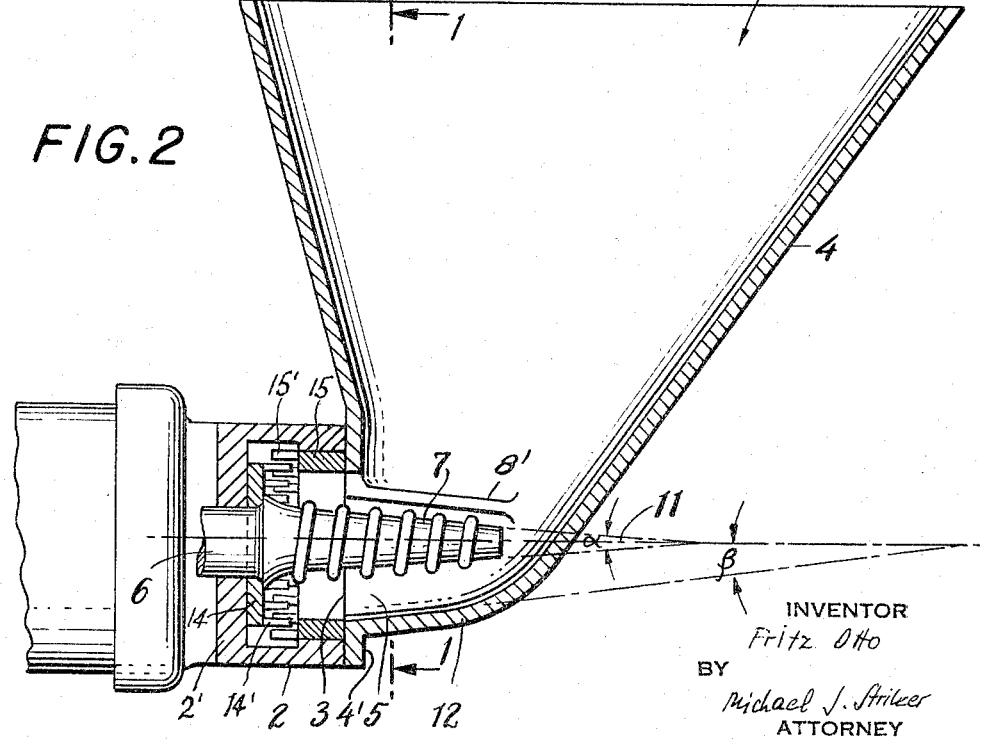

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a sectional view of the charging arrangement, the section being taken along the line 1—1 of FIG. 2, viewed in the direction of the arrows; and FIG. 2 is a partial sectional view of the arrangement shown in FIG. 1, the section being taken along the line 2—2 of FIG. 1 and viewed in the direction of the arrows.

Referring now to the drawing, it will be seen that the meat grinder 1 schematically shown in FIG. 1 has on one end a substantially horizontally arranged casing 2 of substantially cylindrical shape and having at its right end, as viewed in FIG. 2, an open inlet end 3. A feed hopper 4 having a lower portion arranged laterally of the open inlet end 3 of the casing, has at said lower portion an annular flange 4′ joined in any known convenient manner to the right end face, as viewed in FIG. 2, of the casing 2. The annular flange 4′ defines the outlet end 5 of the hopper, which is aligned with the inlet end 3 of the casing. A drive shaft 6, extending through a central opening in the end wall 2′ of the casing 2 opposite the inlet opening 3 thereof, carries a substantially conical feed screw 7 extending through the inlet opening 3 of the casing and the outlet end 5 of the hopper 4 into the latter. The drive shaft 6 is rotated at high speed about its axis in the direction of arrow A in a known manner by motor means not shown in the drawing and located to the left side of the portion of the meat grinder shown in FIG. 2.

Wall means 8 forming part of the lower portion of the hopper 4 partly surround the feed screw and have an inner surface facing the outer surface of the feed screw 7 and forming with said outer surface a gap 9 continuously decreasing in the direction of rotation on the ascending side of the feed screw. The wall means 8 cover the feed screw on the ascending side thereof and have above the feed screw a longitudinal edge 8′ located adjacent and substantially parallel to a vertical plane 10 including the axis 11 of the feed screw as indicated in dash dotted lines in FIG. 1, for preventing material fed by the feed screw from being upwardly flung on the hopper on the ascending side of the feed screw.

The feed hopper 4 has at the lower portion thereof a bottom wall portion 12 integral with the wall means 8 and downwardly inclined towards the outlet end of the hopper, and the bottom wall portion 12 includes with the axis 11 of the feed screw an acute angle β substantially equal to half of the cone angle α of the feed screw. The longitudinal edge 8′ of the wall means 8 is preferably upwardly inclined towards the outlet end 5 of the hopper and includes with the axis 11 of the feed screw an acute angle also substantially equal to half of the cone angle α of the feed screw.

Pre-cut meat is preferably fed from a chute 16 of a pre-cutter, not shown in the drawing, into the open upper end of the feed hopper 4 and fed by the fast rotating feed screw 7 towards the schematically illustrated cutter which comprises rotating cutter means including a disc 14 fixed to the shaft 6 for rotation therewith and carrying a plurality of teeth 14′ projecting angularly spaced from each other in axial direction from the periphery of the disc 14 and stationary cutter means including a ring member 15 fixed to the casing 2 and carrying a plurality of teeth 15 angularly spaced from each other and radially outwardly of the teeth 14′. The pre-cut meat fed by the feed screw 7 against the disc 14 is driven by centrifugal force through the cooperating teeth 14′ and 15′ to be comminuted thereby and the comminuted meat will leave the casing 2 through the outlet 17. The portion of the wall means 8 extending above the ascending portion 7' of the feed screw will prevent flinging of the fed material upwardly on the ascending side of the feed screw to thereby provide an optimum feed of the material and a complete discharge of the hopper at the end of the charging period.

It will be understood that each of the elements described above, or two or more together, may also find a useful application in other types of charging arrangements differing from the types described above.

While the invention has been illustrated and described as embodied in a charging arrangement for a meat grinder having a horizontally arranged feed screw, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A charging arrangement for a meat grinder or the like, comprising, in combination, a substantially horizontally arranged casing having an open inlet end; a feed hopper connected to said casing and having an outlet end communicating with said inlet end of said casing; a feed screw having a substantially horizontal axis extending through said inlet end of said casing and through said outlet end of said hopper into the latter and being adapted to be rotated at high speed in one direction about its axis said feed screw having a free end in said hopper spaced from a wall portion of the latter facing said outlet end thereof; and wall means in said hopper extending transversely over the ascending side of said feed screw for preventing material fed by the feed screw from being upwardly flung in said hopper on the ascending side of said feed screw.

2. A charging arrangement for a meat grinder or the like, comprising, in combination, a substantially horizontally arranged casing having at one end an inlet opening; a feed hopper having a lower portion laterally arranged at said one end of said casing and having in said lower portion an outlet end aligned with said inlet end of said casing; a feed screw having a substantially horizontal axis extending through said inlet end of said casing and through said outlet end of said hopper into the latter and being adapted to be rotated at high speed in one direction about its axis for feeding the material to be ground in axial direction from said hopper into said casing said feed screw having a free end in said hopper spaced from a wall portion of the latter facing said outlet end thereof; and wall means forming part of said lower portion of said hopper on the ascending side of said feed screw for covering the latter substantially up to a vertical plane including said axis of said feed screw for preventing material fed by the feed screw from being upwardly flung in said hopper on the ascending side of said feed screw.

3. A charging arrangement for a meat grinder or the like, comprising, in combination, a substantially horizontally arranged casing having at one end an inlet opening; a feed hopper having a lower portion laterally arranged at said one end of said casing and having in said lower portion an outlet end aligned with said inlet end of said casing; a feed screw having a substantially horizontal axis extending through said inlet end of said casing and through said outlet end of said hopper into the latter and being adapted to be rotated at high speed in one direction about its axis for feeding the material to be ground in axial direction from said hopper into said casing; and wall means forming part of said lower portion of said hopper on the ascending side of said feed screw, said wall means partly surrounding said feed screw and having an inner surface facing the outer surface of said feed screw and forming with said outer surface a gap, said wall means covering said feed screw on the ascending side thereof and having above said feed screw a longitudinal edge extending closely adjacent and substantially parallel to a vertical plane including the axis of said feed screw and thus preventing material fed by the feed screw from being upwardly flung in said hopper on the ascending side of said feed screw said gap continuously decreasing in said one direction on the ascending side of said feed screw at least from said vertical plane up to said longitudinal edge of said wall means.

4. A charging arrangement for a meat grinder or the like, comprising, in combination, a substantially horizontally arranged casing having at one end an inlet opening; a feed hopper having a lower portion laterally arranged at said one end of said casing and having in said lower portion an outlet end aligned with said inlet end of said casing; a substantially conical feed screw having a substantially horizontal axis extending through said inlet end of said casing and through said outlet end of said hopper into the latter and being adapted to be rotated at high speed in one direction about its axis for feeding the material to be ground in axial direction from said hopper into said casing, said feed screw having a free end in said hopper and tapering towards said free end; and wall means forming part of said lower portion of said hopper on the ascending side of said feed screw, said wall means partly surrounding said feed screw and having an inner surface facing the outer surface of said feed screw and forming with said outer surface a gap continuously decreasing in said one direction on the ascending side of said feed screw, said wall means covering said feed screw on the ascending side thereof and having above said feed screw a longitudinal edge extending closely adjacent and substantially parallel to a vertical plane including the axis of said feed screw and thus preventing material fed by the feed screw from being upwardly flung in said hopper on the ascending side of said feed screw, said lower portion of said hopper having a bottom wall portion integral with said wall means, said bottom wall portion including an acute angle with said axis of said feed screw and being inclined to said axis so that said bottom wall portion is closest to said axis at said free end of said feed screw.

5. A charging arrangement for a meat grinder or the like, comprising, in combination, a substantially horizontally arranged casing having at one end an inlet opening; a feed hopper having a lower portion laterally arranged at said one end of said casing and having in said lower portion in outlet end aligned with said inlet end of said casing; a substantially conical feed screw having a substantially horizontal axis extending through said inlet end of said casing and through said outlet end of said hopper into the latter and being adapted to be rotated at high speed in one direction about its axis for feeding the material to be ground in axial direction from said hopper into said casing, said feed screw having a free end in said hopper and tapering towards said free end; and wall means forming part of said lower portion of said hopper on the ascending side of said feed screw, said wall means partly surrounding said feed screw and having an inner surface facing the outer surface of said feed screw and forming with said outer surface a gap continuously decreasing in said one direction on the ascending side of said feed screw, said wall means covering said feed screw on the ascending side thereof and having above said feed screw a longitudinal edge extending closely adjacent and substantially parallel to a vertical plane including the axis of said feed screw and thus preventing material fed by the feed screw from being upwardly flung in said hopper on the ascending side of said feed screw, said lower portion of said hopper having a bottom wall portion integral with said wall means, said bottom wall portion including an acute angle with said axis of said feed screw substantially equal to half the cone angle of said feed screw and being inclined to said axis so that said bottom wall portion is closest to said axis at said free end of said feed screw.

6. A charging arrangement for a meat grinder or the like, comprising, in combination, a substantially horizontally arranged casing having at one end an inlet opening; a feed hopper having a lower portion laterally arranged at said one end of said casing and having in said lower portion an outlet end aligned with said inlet end of said casing; a substantially conical feed screw having a substantially horizontal axis extending through said inlet end of said casing and through said outlet end of said hopper into the latter and being adapted to be rotated at high speed in one direction about its axis for feeding the material to be ground in axial direction from said hopper into said casing, said feed screw having a free end in said hopper and tapering towards said free end; and wall means forming part of said lower portion of said hopper on the ascending side of said feed screw, said wall means partly surrounding said feed screw and having an inner surface facing the outer surface of said feed screw and forming with said outer surface a gap continuously decreasing in said one direction on the ascending side of side feed screw, said wall means covering said feed screw on the ascending side thereof and having above said feed screw a longitudinal edge extending closely adjacent and substantially parallel to a vertical plane including the axis of said feed screw and thus preventing material fed by the feed screw from being upwardly flung in said hopper on the ascending side of said feed screw, said lower portion of said hopper having a bottom wall portion integral with said wall means, said bottom wall portion including an acute angle with said axis of said feed screw substantially equal to half the cone angle of said feed screw and being inclined to said axis so that said bottom wall portion is closest to said axis at said free end of said feed screw, said longitudinal edge of said wall means being upwardly inclined toward the outlet end of said hopper and including with the axis of said feed screw an acute angle substantially equal to half of the cone angle of said feed screw.

7. A charging arrangement for a meat grinder of the like comprising, in combination, a substantially horizontally arranged casing having at one end an inlet opening; a feed hopper having a lower portion arranged laterally at said one end of said casing and having in said lower portion an outlet end aligned with said inlet end of said casing; a feed screw having a substantially horizontal axis extending through said inlet end of said casing and through said outlet end of said hopper into the latter and being adapted to be rotated at high speed in one direction about its axis for feeding material to be ground in axial direction from said hopper into said casing, said feed screw having a free end in said hopper spaced from a wall portion of said hopper facing said outlet end of the latter; and wall means forming part of said lower portion of said hopper on the ascending side of said feed screw, said wall means partly surrounding said feed screw and having an inner surface facing the outer surface of said feed screw and forming with said outer surface a gap, said wall means covering said feed screw on the ascending side thereof and having above said feed screw a longitudinal edge and thus precenting material fed by said feed screw from being flung in said hopper on the ascending side of said feed screw, said lower portion of said hopper having a bottom wall integral with said wall means and facing said feed screw.

References Cited by the Examiner

UNITED STATES PATENTS

| | | | |
|---|---|---|---|
| 472,973 | 4/1892 | Arnaud | 146—186 |
| 1,244,352 | 10/1917 | McNally | 241—247 X |
| 1,350,164 | 8/1920 | Loichot | 146—189 |
| 1,736,333 | 11/1929 | Van Hooydonk | 146—182 |
| 2,405,692 | 8/1946 | Hall | 241—247 X |
| 2,581,031 | 1/1952 | Kruzik | 146—190 X |
| 2,807,832 | 10/1957 | Davis | 146—182 X |

FOREIGN PATENTS 952,266  3/1939  Sweden.

ROBERT C. RIORDON, *Primary Examiner.*

W. GRAYDON ABERCROMBIE, *Examiner.*